United States Patent [19]

Ogawa

[11] Patent Number: 4,567,409
[45] Date of Patent: Jan. 28, 1986

[54] CONTROL CIRCUIT FOR MOTOR

[75] Inventor: Masahiko Ogawa, Tokyo, Japan

[73] Assignee: Canon Kabushiki Kaisha, Tokyo, Japan

[21] Appl. No.: 620,102

[22] Filed: Jun. 13, 1984

[30] Foreign Application Priority Data

Jun. 16, 1983 [JP] Japan .................. 58-108488

[51] Int. Cl.$^4$ ............................................. G05B 5/00
[52] U.S. Cl. .................................. 318/327; 318/317; 318/331
[58] Field of Search ............... 318/314, 317, 326, 327, 318/332, 339, 341, 342, 331, 397, 398

[56] References Cited

U.S. PATENT DOCUMENTS

| 3,696,278 | 10/1972 | Kuniyoshi et al. | 318/327 |
| 3,743,906 | 7/1973 | Torok | 318/327 X |
| 3,855,511 | 12/1974 | Smith | 318/317 |
| 3,878,446 | 4/1975 | Brandt | 318/317 |
| 3,983,464 | 9/1976 | Peterson | 318/327 |
| 4,119,897 | 10/1978 | Skoog | 318/317 X |
| 4,284,942 | 8/1981 | Bigley et al. | 318/332 X |

OTHER PUBLICATIONS

Robert J. Traister, "All About Electric and Hybrid Cars", Tab Books Inc., Blue Ridge Summit, Pa. 17214, 1982, pp. 55-57.

Primary Examiner—Ulysses Weldon
Attorney, Agent, or Firm—Toren, McGeady, Stanger, Goldberg & Kiel

[57] ABSTRACT

The disclosed motor control circuit includes a speed loop controlling the rotational speed of the rotor of a motor. A phase control loop controls the rotational phase of the rotor, and a voltage control loop controls a voltage applied to a winding of the motor according to the current flow through the winding. The voltage control loops maintains the rotational speed and rotational phase constant despite variations in the load torque. The control circuit is especially well-suited for motors having a small torque.

2 Claims, 3 Drawing Figures

CONTROL CIRCUIT FOR MOTOR

BACKGROUND OF THE INVENTION

1. Field of the Invention

This invention relates to a control circuit for a motor and more particularly to a control circuit arranged to satisfactorily control the rotational phase of the rotor of the motor.

2. Description of the Prior Art

In controlling the rotational phase of the rotor of a motor, applying control solely to the rotational phase may be satisfactory for a motor where the rotor has a large moment of inertia, where the load on the rotor is small or has little fluctuation, or where a high degree of rotational precision is not required. However, where the moment of inertia of the rotor is small, where the load fluctuates to a great degree, or where a high degree of precision is required for the rotor, simple phase control is unstable and often cannot meet performance requirements. In such cases, therefore, speed control is generally provided in addition to phase control. In another known method, a negative feedback is arranged to decrease the current supply to the winding of the motor when the current supply increases.

The kinds of apparatuses incorporating servo motors have generally become smaller in size. Accordingly, the servo motor used in these kinds of apparatuses must also be smaller. Reduction in the size of the motor reduces the motor's torque. As a result of this smaller motor torque, when the normal load fluctuates due to changes in temperature, or in the kind of the load, etc., the voltage applied to the driving winding of the motor must be changed in accordance with the load torque to insure that the rotor maintains a constant rotational phase and speed. Since the speed detecting component produces a constant signal as the rotor rotates at a predetermined speed, the phase detection component must compensate for the degree of change ($\Delta v$) in the voltage applied to the driving winding due to the fluctuation in load torque. However, if the gain of the phase control loop is for example. A, the phase would deviate from a predetermined desired phase by as much as $\Delta v/A$.

SUMMARY OF THE INVENTION

This invention is directed to the solution of the problems described in the foregoing and it is an object of the invention to provide a novel control circuit for a motor which obviates the shortcomings of the prior art.

It is another object of the invention to provide a control circuit which is highly suited for a motor of small torque.

It is a further object of the invention to provide a control circuit for a motor which is capable of keeping rotational phase control over the rotor of the motor in a proper state despite fluctuations in the load on the motor and which is particularly suited for a motor of small torque.

Under these objects and according to a preferred embodiment embodying an aspect of the present invention, a control circuit for a motor having a rotor and a winding for generating a magnetic flux in response to a supplied electrical current, comprises first means for controlling the rotational speed of the rotor, second means for controlling the rotational phase of the rotor, and third means for controlling an electrical voltage to be applied to the winding in accordance with the current flowing through the winding.

These and further objects and features of the invention will become apparent from the following detailed description of a preferred embodiment thereof taken in connection with the accompanying drawings.

DETAILED DESCRIPTION OF THE PREFERRED EMBODIMENT

Figure 1:
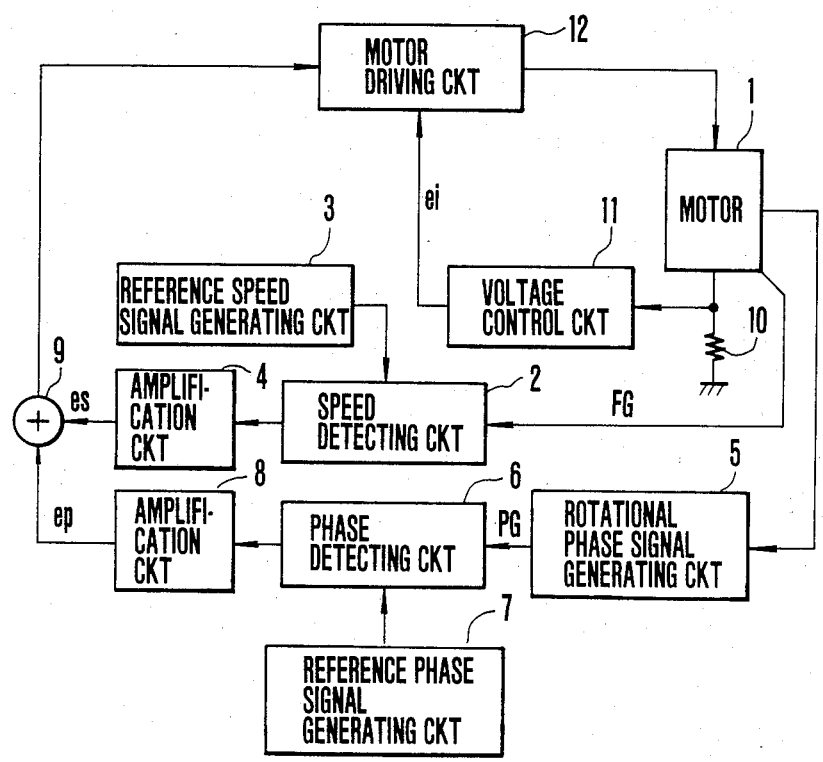
FIG. 1 is a block diagram schematically showing an embodiment of this invention.

FIG. 1, which shows a preferred embodiment of the invention, includes a motor 1; a speed detecting circuit 2 arranged to compare a rotational speed signal FG having a frequency corresponding to the rotational speed (frequency) of the rotor of the motor 1 with a reference speed (frequency) signal produced from a reference speed (frequency) signal generating circuit 3 and to produce a voltage corresponding to the difference obtained by the comparison; an amplification circuit 4 arranged to amplify the output of the speed detecting circuit 2; a phase signal generating circuit 5 which generates a signal PG indicative of the rotational phase of the rotor of the motor 1; a phase detecting circuit 6 arranged to compare the rotational phase signal PG from the phase signal generating circuit 5 with a reference phase signal from a reference phase signal generating circuit 7 and to produce a voltage corresponding to the difference between them; an amplification circuit 8 which amplifies the output of the phase detecting circuit 6; a voltage addition circuit 9 arranged to add together the outputs of the amplification circuits 4 and 8; a resistor 10 arranged to detect in the form of a voltage a current flowing through the driving winding of the motor 1; a voltage control circuit 11 arranged to control the voltage applied to the winding on the basis of the voltage from the resistor 10; and a motor driving circuit 12 which drives the motor 1 in response to the outputs of the voltage addition circuit 9 and the voltage control circuit 11. In this embodiment, a speed control loop for the motor 1 is formed by the circuits 2, 3, 4, 9 and 12 and a phase control loop for the motor 1 is formed by the circuits 5, 6, 7, 8, 9 and 12. A positive feedback voltage control loop is formed by the circuits 10, 11 and 12.

In a motor control circuit arranged in this manner, the signal FG, indicative of the rotational speed or frequency of the rotor of the motor 1, is compared in the speed detecting circuit 2 with the reference speed signal from the reference speed signal generating circuit 3 and a voltage which corresponds to the difference between these signals is obtained. The difference or error signal obtained is amplified by amplification circuit 4 to obtain a voltage es. On other hand, the rotational phase signal generating circuit 5 produces the signal PG indicative of the rotational phase of the rotor of the motor 1. The signal PG is compared in the phase detecting circuit 6 with the reference phase signal from the reference phase signal generating circuit 7 and a voltage corresponding to the phase difference between these phase signals is obtained from the phase detecting circuit 6. The phase difference voltage is amplified by amplification circuit 8 to obtain a voltage ep. These voltages es and ep are added up in addition circuit 9. The sum obtained is supplied to the motor driving circuit 12 and the rotation of the rotor is thereby controlled. Further, the resistor 10 detects, in the form of a voltage, the current flowing through the winding of the motor 1. The voltage thus obtained is converted in voltage control circuit 11 to a control voltage ei. Control voltage ei is supplied to the motor driving circuit 12. The control arrangement is such that an increase in the current flowing through the winding of the motor 1 causes the voltage applied to the winding to increase. Conversely, a decrease in the current flowing through the winding causes the voltage applied thereto to decrease. This will be further described by reference to FIG. 2.

Figure 2:
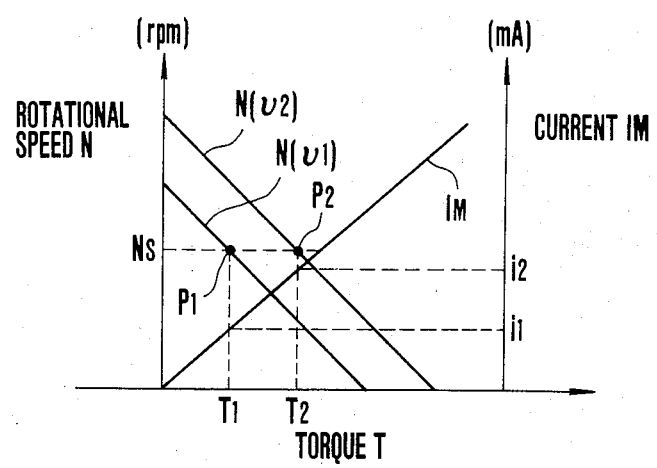
FIG. 2 is a graph showing the torque-rotational speed characteristic of the motor for illustrating the operation of the circuit arrangement of FIG. 1

Referring to FIG. 2, the torque—rotational speed relationship of a DC motor generally shows a dropping characteristic. Motor current IM increases as load torque T increases. Assuming that the rotor of the motor is controlled at a rotational speed NS when the load torque T is T1, a voltage VM applied to the winding of the motor is v1 and is stable at a point P1. At this instant, the current IM is at a value i1. However, in the event of a change of the load torque T from T1 to T2 for some reason such as a change in temperature or the like, the voltage VM to applied to the winding must be change from the value v1 to another value v2 in order to control the rotor at the same rotational speed NS. In that event, the voltage is stable at the point P2 on the torque—rotational speed diagram. The current in that instance is a value i2. Therefore, the conventional servo method applying only phase control and speed control is incapable of compensating for the voltage variation $v2-v1$. In other words, assuming that the voltage applied to the winding is VM, the counter electromotive voltage due to the rotation of the rotor is E, the current flowing through the winding is IM and the internal resistance is rM, the following relationship obtains:

$$VM = E + IM \cdot rM$$

Since the counter electromotive voltage E is a product of a counter electromotive constant KE for a given motor and the rotational speed N of the rotor, the relationship $E = KE \cdot N$ prevails. When the rotational speed NS does not vary, the counter electromotive voltage E does not vary. Accordingly, the error signal es reaches zero in the speed control system when the rotational speed reaches a desired value. Accordingly, in the phase control system, the above-stated voltage difference, $\Delta v = v2 - v1$, must be corrected. Therefore, assuming that the gain of the phase control loop is a, the phase error signal ep of value $\Delta v/A$ is required for obtaining a stable state.

In an embodiment of this invention, the current difference $\Delta i = i2 - i1$, is detected by resistor 10. The detected current is converted into a voltage of $\Delta v = v2 - v1$ and this voltage is applied to the winding. Therefore, even in the event of a change in the load torque, the rotation of the rotor can be controlled at a predetermined rotational speed, so that not only the speed error but also the phase error can be kept almost at zero.

Figure 3:
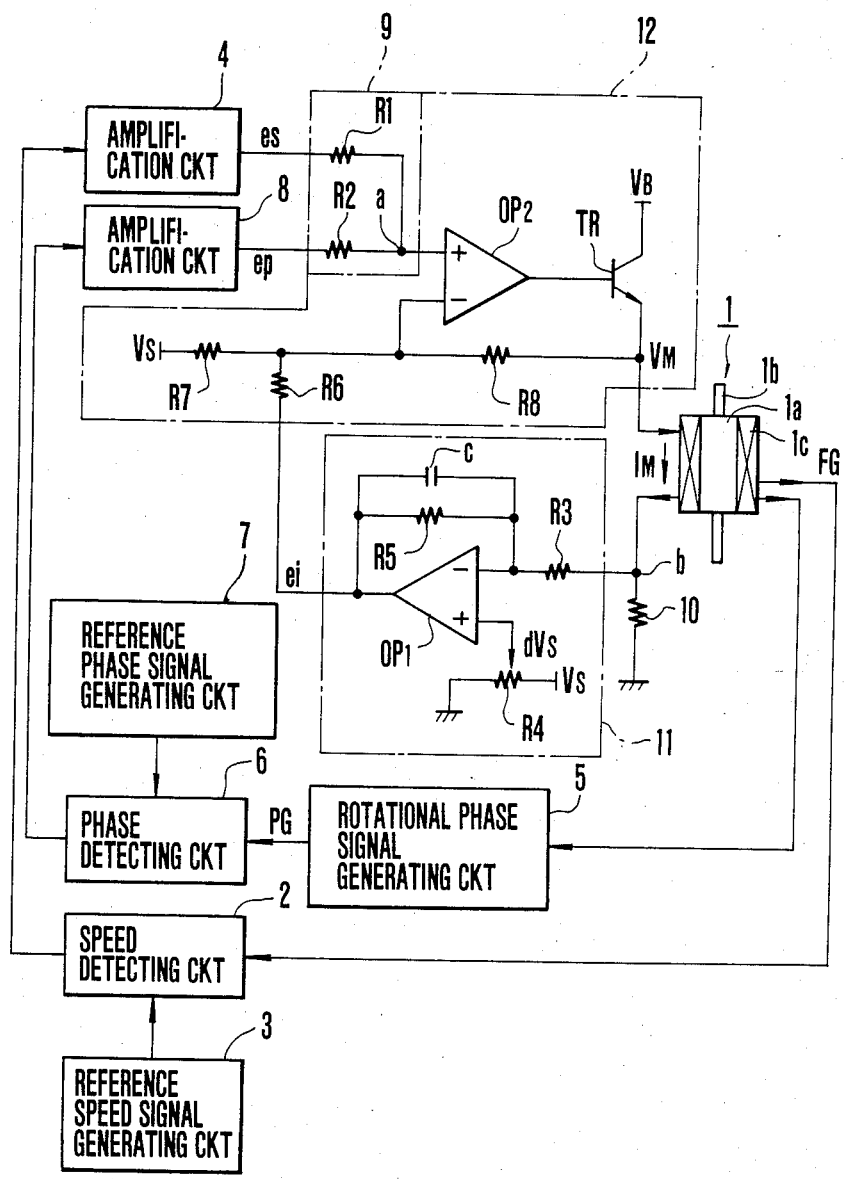
FIG. 3 is a circuit diagram showing the specific arrangement of the essential parts of the embodiment shown in FIG. 1.

FIG. 3 shows by way of example the arrangement of the essential parts of FIG. 1, particularly including the addition circuit 9, voltage control circuit 11 and motor driving circuit 12. The voltages es and ep produced from the amplification circuits 4 and 8 are added up or combined together at a connection point "a" through resistors R1 and R2 in the addition circuit 9. The motor 1 is provided with a rotor 1a mounted on a rotor shaft 1b. In this specific example, a driving winding 1c arranged to generate a magnetic flux according to a current supplied thereto is provided on the rotor 1a. The rotational speed signal FG, generated from a known arrangement (not shown) according to the rotation of a rotor 1a, is supplied to the speed detecting circuit 2. The rotational phase signal generating circuit 5 is arranged in a known manner to generate the rotational phase signal PG according to the rotation of rotor 1a. The signal PG is supplied to the phase detecting circuit 6. In FIG. 3, other components of the motor 1 such as a permanent field system, etc. are omitted from illustration.

Resistor 10 is connected in series with the winding 1c. A voltage appears at a connection point "b" according to the current IM flowing through the winding 1c, i.e., a voltage appears at both ends of the resistor 10. This voltage is supplied via a resistor R3 to the inversion input terminal ($-$) of an operational amplifier OP1 included in the voltage control circuit 11. To the non-inversion input terminal ($+$) of the amplifier OP1 is supplied a predetermined voltage dVs ($d > 1$) obtained by dividing a reference voltage Vs by a variable resistor R4. Between the inversion input terminal ($-$) and the output terminal of the amplifier OP1 is provided a parallel connection of a resistor R5 and a capacitor C. The resistor R5 and the capacitor C form a low-pass filter to remove an unnecessary high frequency component from the output of the winding 1c of the motor 1.

The output of the operational amplifier OP1, i.e., the voltage ei produced from the voltage control circuit 11, is supplied via a resistor R6 to the inversion input terminal ($-$) of an operational amplifier OP2 in the motor driving circuit 12. A reference voltage Vs is also supplied via a resistor R7 to the inversion input terminal ($-$) of the operational amplifier OP2. To the non-inversion input terminal ($+$) of this amplifier OP2 is applied the output of the addition circuit 9. The output of the amplifier OP2 is supplied to the base of a current amplifying transistor TR. The collector of the transistor TR is connected to a motor driving power source VB. The emitter of the transistor TR is connected to the winding 1c of the motor 1 and also the inversion input terminal ($-$) of the amplifier OP2 via a resistor R8.

In operation, when the rotational speed of the rotor 1a is low, the voltage es produced from amplification circuit 4 is high and cause the output of the amplifier OP2 of the motor driving circuit 12 to increase. With the output of the amplifier OP2 increased, the voltage VM applied via the transistor TR to the winding 1c increases to increase the rotational speed of the rotor 1a. Conversely, in the event of a high rotational speed of the rotor 1a, the voltage es produced from the amplification circuit 4 is low and lowers the output of the amplifier OP2. Then, the voltage VM applied to the winding 1c via the transistor TR lowers to lower the rotational speed of the rotor 1a. When the rotational speed of the rotor 1a comes to satisfy a predetermined relationship to the reference speed signal produced from the reference speed signal generating circuit 3, the rotational phase control based on the voltage ep produced from the amplification circuit 8 is accomplished.

Where the rotor 1a is rotating at a predetermined rotational speed NS and at a predetermined phase under a predetermined load T1, the output voltage ei of the voltage control circuit 11 is stable, with the voltage applied to the winding 1c assumed to be v1 and the winding current flowing through the resistor 10 assumed to be i1. When the load torque on the rotor 1a increases from T1 to T2, the voltage applied to the winding 1c must be increased from v1 to v2 to maintain the rotational speed of the rotor 1a at the above-stated predetermined rotational speed NS against the increase in the load torque. In other words, to keep the rotation of the rotor 1a at the predetermined rotational speed NS and at the predetermined phase despite the increased load torque, the voltage applied to the winding 1c must be increased from v1 to v2 without changing the voltage supplied to the non-inversion input terminal of the amplifier OP2 in the motor driving circuit 12. For that purpose, in the case of this embodiment, the increased portion $\Delta i = i2 - i1$ of the winding current is detected in the form of a voltage and then, in accordance with this voltage, the voltage control circuit 11 changes its output voltage ei to increase the voltage v1 applied to the winding 1c to a voltage v2. In other words, the voltage control circuit 11 in this instance lower its output voltage ei. Therefore, as viewed from the output side of the voltage control circuit 11, the amplifier OP2 of the motor driving circuit 12 functions as an inverting amplifier and serves to raise the output voltage thereof. Accordingly, in the control loop consisting of the resistor 10 and the circuits 11 and 12, there is preset a constant k to satisfy the relationship $\Delta v = v2 - v1 = k\Delta i$ (wherein k: a current-to-voltage conversion constant). With the constant k set in this manner, the rotation of the rotor 1a can be kept at the predetermined speed and phase by a stable servo operation irrespective of fluctuations of the load imposed on the rotor 1a.

This invention is based on fact that the variations in the load torque of a motor result in variations of the current flowing through the winding of the motor. In accordance with the invention, as previously described in detail, the current flowing through the winding is detected and the voltage applied to the winding is controlled according to the current variations by means of a voltage control loop (positive feed back loop) in such a way as to correct variations of the voltage applied to the winding due to changes of the load torque. More specifically, the level of the voltage applied to the winding is shifted according to the load torque change detected from the current change flowing through the winding. The provision of adequate speed and phase control ensures satisfactory phase control even under a fluctuating load. Further, to eliminate instability that might result from the application of voltage control according to the current flowing through the winding, the speed control loop is arranged to raise the gain thereof according to the voltage control.

The motor control circuit according to this invention permits, for example, vertical or horizontal synchronizing signals to be precisely arranged between recording tracks during video signal recording operations on recording tapes, rotating discs, etc. Then, during a signal reproducing operation, variations in the time base of the signal can be minimized. The invention permits reduction in size, weight and cost of motors applicable to such recording/reproducing apparatuses. Further, the invention is advantageously applicable to a control circuit for a rotary head driving motor for a recording tape and for a disc rotating motor for a recording disc.

In the embodiment given, the invention is described as applied to a circuit arrangement for a motor having a driving winding arranged to be rotated together with a rotor. However, the invention is of course also applicable to other types of motors in general such as a brushless motor, a coreless motor, etc., and is especially well-suited for a compact DC motor.

What I claim is:

1. A circuit arrangement for controlling a motor having a rotor and a winding for driving the rotor in response to a supplied electrical current, comprising:

(A) a first reference signal generating circuit for generating a first reference signal indicative of a predetermined rotational speed to which the rotational speed of said rotor is to be adjusted;

(B) a second reference signal generating circuit for generating a second reference signal indicative of a predetermined rotational phase to which the rotational phase of said rotor is to be adjusted;

(C) a first detection circuit for detecting deviation of the rotational speed of said rotor from said predetermined speed and for producing a first control signal corresponding to said speed deviation;

(D) a second detection circuit for detecting deviation of the rotational phase of said rotor from said predetermined phase and for producing a second control signal corresponding to said phase deviation;

(E) a third detection circuit for detecting the level of the electrical current flowing through said winding and for producing a third control signal corresponding to said current level; and (F) a control circuit responsive to said first, second and third control signals for controlling the electrical current and voltage to be supplied to said winding;

said control circuit being arranged to increase the level of the voltage to be applied to said winding when an increase in the level of the electrical current flowing through the winding is indicated by said third control signal.

2. The circuit arrangement according to claim 1, wherein said third detection circuit includes;

a resistor electrically connected with said winding for detecting the level of the electrical current flowing through the winding; and a control signal producing circuit for producing said third control signal on the basis of the electrical current level detected through said resistor.

* * * * *